(12) United States Patent
Duncan et al.

(10) Patent No.: US 7,631,839 B1
(45) Date of Patent: Dec. 15, 2009

(54) ENHANCED MULTIPLE INSTRUMENT DISTRIBUTED APERTURE SENSOR

(75) Inventors: Alan L. Duncan, Sunnyvale, CA (US); Robert D. Sigler, Cupertino, CA (US); David M. Stubbs, Mountain View, CA (US); Eric H. Smith, San Jose, CA (US); Richard L. Kendrick, San Mateo, CA (US); Joseph T. Pitman, Pine, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 425 days.

(21) Appl. No.: 11/205,012

(22) Filed: Aug. 17, 2005

Related U.S. Application Data (60) Provisional application No. 60/602,875, filed on Aug. 20, 2004.

(51) Int. Cl.
*B64G 1/00* (2006.01)
(52) U.S. Cl. .............. 244/158.1; 244/173.1; 359/365; 359/399
(58) Field of Classification Search .............. 244/158.1, 244/173.1, 173.2, 173.3; 359/365, 399, 730, 359/850, 853, 858, 861; 353/3, 126
See application file for complete search history.

(56) References Cited

U.S. PATENT DOCUMENTS

| | | | | |
|---|---|---|---|---|
| 3,604,788 | A | * | 9/1971 | Paige et al. .................. 359/218 |
| 4,856,884 | A | | 8/1989 | Fender et al. |
| 4,886,330 | A | * | 12/1989 | Linick .......................... 359/212 |
| 4,953,964 | A | | 9/1990 | Anafi et al. |
| 5,058,993 | A | * | 10/1991 | Wakugawa .................. 359/896 |
| 5,114,238 | A | * | 5/1992 | Sigler .......................... 359/399 |
| 5,131,611 | A | * | 7/1992 | Vollaro ...................... 244/173.1 |
| 5,208,654 | A | * | 5/1993 | Shao et al. ................... 356/498 |
| 5,282,082 | A | | 1/1994 | Espie et al. |
| 5,291,333 | A | | 3/1994 | Mills et al. |

(Continued)

OTHER PUBLICATIONS

W Curdt. "Solar observations from space and from the ground", copyright 2002 Wiley-VCH Verlad Berlin GmbH & Co KGaA, Weinheim 0000 0004-6337/00/0000-0000. p. 3.*

(Continued)

*Primary Examiner*—Michael R Mansen
*Assistant Examiner*—Philip J Bonzell
(74) *Attorney, Agent, or Firm*—McDermott Will & Emery LLP (57) ABSTRACT

A multiple instrument distributed aperture sensor ("MIDAS") science payload system mounted on a spacecraft, including a spacecraft interface ring affixing the MIDAS science payload system to the spacecraft, and a multiple telescope array ("MTA") further including a mechanical subsystem further including an optical bench, an optical subsystem mounted upon the mechanical subsystem collecting light and merging the light into a passive, actively-sensed or hyperspectral image, and a laser subsystem providing laser illumination for collecting active remote sensing data. The MIDAS science payload system also includes a hexapod in physical communication with and between the spacecraft interface ring and the mechanical subsystem. The MIDAS science payload system further includes a plurality of launch locks affixed to the spacecraft interface ring supporting the MTA in a stowed configuration, and a plurality of science instruments ("SIs") mounted on the mechanical subsystem obverse to the optical subsystem, individually and concurrently sensing the passive, actively sensed or hyperspectral image.

40 Claims, 7 Drawing Sheets

U.S. PATENT DOCUMENTS

| | | | |
|---|---|---|---|
| 5,654,549 A * | 8/1997 | Landecker et al. | 250/332 |
| 5,768,040 A * | 6/1998 | Macenka et al. | 359/859 |
| 5,898,529 A * | 4/1999 | Meyer et al. | 359/853 |
| 5,905,591 A * | 5/1999 | Duncan et al. | 359/399 |
| 5,996,940 A * | 12/1999 | McVey et al. | 244/173.1 |
| 6,018,587 A * | 1/2000 | Cabib | 382/165 |
| 6,429,415 B1 * | 8/2002 | Rhoads | 250/208.1 |
| 6,609,931 B2 * | 8/2003 | Parrish et al. | 439/578 |
| 6,721,043 B2 * | 4/2004 | Platt et al. | 356/124 |
| 6,819,483 B1 * | 11/2004 | Sigler et al. | 359/364 |
| 6,837,586 B2 * | 1/2005 | Rhoads | 359/872 |
| 6,880,943 B2 * | 4/2005 | Fiete et al. | 359/850 |
| 7,034,945 B2 * | 4/2006 | Kendrick et al. | 356/456 |
| 2002/0029610 A1 * | 3/2002 | Chrystall et al. | 73/7 |
| 2002/0104927 A1 * | 8/2002 | Pedreiro | 244/158 R |
| 2004/0151504 A1 * | 8/2004 | Triebes et al. | 398/131 |
| 2004/0204540 A1 * | 10/2004 | Shinozaki | 524/588 |

OTHER PUBLICATIONS

T. W. Stuhlinger, "All-Reflective Phased Array Imaging Telescopes," International Lens Design Conference, G.N. Lawrence, ed., Proc. Soc. Photo-Opt. Instrumentation Eng. 1354, pp. 438-446 (1990).

* cited by examiner

ENHANCED MULTIPLE INSTRUMENT DISTRIBUTED APERTURE SENSOR

CROSS-REFERENCE TO RELATED APPLICATION

This application claims priority to U.S. Provisional Patent Application No. 60/602,875, filed Aug. 20, 2004, which is incorporated herein by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD OF THE INVENTION

The present invention generally relates to a space-based sensor system and, in particular, relates to a multiple instrument distributed aperture sensor ("MIDAS") for a large-aperture, wide field-of-view ("FOV"), space telescope diffraction-limited to the synthetic aperture diameter.

DESCRIPTION OF THE RELATED ART

Conventional monolithic or segmented telescopes each have limitations and drawbacks associated with their respective designs. Generally, however, conventional telescopes, such as three-mirror anastigmats ("TMAs"), are very expensive and have a large mass and volume which severely limits overall mission capability. Furthermore, in the axial direction of the launch vehicle, a conventional monolithic telescope is not compact, complicating system packaging and integration.

It is therefore considered highly desirable to provide for enhanced sensor systems with improved cost, mass, size and performance characteristics, to aid the design, construction and implementation of space telescopes.

SUMMARY OF THE INVENTION

The present invention generally relates to a space-based sensor system and, in particular, relates to a MIDAS for a large-aperture, wide FOV, space telescope diffraction-limited to the synthetic aperture diameter, operating in the ultraviolet ("UV"), visible, and infrared ("IR") wavelengths.

To solve the above-described problems of conventional telescopes, the present invention provides a MIDAS science payload sensor system for a large-aperture, wide-field, diffraction-limited telescope at a fraction of the cost, mass and volume of conventional space telescopes. MIDAS acts as an integrated science payload with common front-end optics, while accommodating a collection of multiple back-end science instruments ("SIs") tailored to the remote sensing data collection needs of a specific mission. MIDAS features a concurrent imaging mode that allows these back-end SIs to process images in parallel, as well as a high-resolution hyperspectral imaging mode. Imaging spectroscopy is achieved by means of operating the optical pathlength delay controls in MIDAS, acting as a Fourier Transform Imaging Spectrometer ("FTIS").

MIDAS also integrates a laser subsystem that enables active remote sensing techniques such as illumination, ablative spectroscopy, vibrometry and light detection and ranging ("LIDAR"). MIDAS is highly scalable in its array characteristics, effective aperture size, types of back-end SIs and other key features.

According to one arrangement, the present invention is a MIDAS science payload system mounted on a spacecraft. The system includes a spacecraft interface ring, the spacecraft interface ring affixing the MIDAS science payload system to the spacecraft. The MIDAS science payload includes a hexapod assembly extending from the spacecraft interface ring to the centrally located optical bench of a mechanical subsystem, which supports the SIs as well as a multiple telescope array ("MTA"). The MTA further includes the mechanical subsystem further including the optical bench, an optical subsystem mounted upon the mechanical subsystem, the optical subsystem collecting light and merging the light into a passive, actively sensed or hyperspectral image, including performing Wavefront Sensing and Control ("WFSC") functions, and a laser subsystem, the laser subsystem providing laser illumination. The MIDAS science payload system also includes a pointing and control subsystem ("PCS"), the PCS providing six degree-of-freedom motion to the mechanical subsystem in an operational configuration, and further including the hexapod in physical communication with and between the spacecraft interface ring and the mechanical subsystem. The MIDAS science payload system further includes a plurality of launch locks affixed to the spacecraft interface ring, the plurality of launch locks supporting the MTA in a stowed configuration, and a plurality of SIs mounted on the optical bench obverse to the optical subsystem, the plurality of SIs individually and concurrently sensing the passive, actively sensed or hyperspectral image.

In general, MIDAS uses an array of collector telescopes together with relay optics, a combiner, and a set of back-end SIs to form an advanced remote sensing system. A 1.5 meter MIDAS point design uses nine 35-centimeter aperture telescopes arranged in a circular sparse array having a 50% array fill factor to form a synthetic aperture of 1.5 meters, packaged within a compact payload volume of only 1.6 meters in diameter by 1.5 meters long. A circular optical bench provides a stable reference for the co-mounted optical subsystem and back-end SIs. When MIDAS is operational, the optical bench is supported and pointed by the hexapod assembly mounted from the spacecraft interface plate.

The optical bench is circular, providing a stable reference for the optical subsystem and the plurality of SIs. The optical bench is comprised of a thermally stable material, such as a graphite-cyanate composite, and is lightweighted, such as by sandwich-style construction.

The optical subsystem further includes a plurality of collector telescopes each with a primary and a secondary mirror, the plurality of collector telescopes arranged in a circular sparse array, a central combiner, and a plurality of relay optics sections, the plurality of relay optics sections transporting light from the plurality of collector telescopes to the central combiner without introducing image rotation or affecting light polarization. Active closed-loop control of these optical elements enables autonomous focus and stabilization of imagery working directly from the scene being remotely sensed, whether a point source or an extended scene.

The plurality of collector telescopes include nine 35-centimeter aperture afocal collector telescopes, where the plurality of collector telescopes arranged in the circular sparse array have a 50% array fill factor. The plurality of collector telescopes comprise a synthetic aperture of 1.5 meters. The multiple instrument distributed aperture sensor science payload is packaged within a payload volume of 1.6 meters in diameter by 1.5 meters long.

Each of the plurality of collector telescopes have a Four-Mirror Cassegrain-Gregorian ("FMCG") collector design, and produce a real exit pupil located at a considerable distance behind the primary mirror, fully corrected for sine magnification error. The central combiner is a three-mirror anastigmat, further including an internal steering mirror at an exit pupil. The central combiner further includes a selector mirror, where the selector mirror directs the image to at least one of the plurality of SIs.

The plurality of relay optics sections further include at least one fixed mirror and at least one active plano mirror, and are disposed in nominally collimated light. The plurality of relay optics sections each provide tip/tilt control, piston control, and/or exit pupil mapping.

The laser subsystem enables light detection and ranging ("LIDAR"), vibrometry, illumination, ablative spectroscopy, breakdown spectroscopy, fluorescence spectroscopy, Raman spectroscopy, and/or time-resolved spectroscopy. One or more collectors are used for delivery of the laser.

The hexapod further includes six actuated struts, where each actuated strut further functions as a linear actuator by means of a rotary motor driving a ball nut device, a structural tube, and a flexured fitting on each end of the strut. Each actuated strut further includes a low outgassing liquid or a solid lubricant. The structural tube is comprised of a graphite cyanate composite.

The MIDAS science payload system further includes a thermal control subsystem, a command and data handling subsystem, and/or an electrical power subsystem. The plurality of launch locks include three launch locks, where the plurality of launch locks are comprised of a metal or composite material. The plurality of launch locks are bolted to the spacecraft interface ring. The plurality of launch locks are paired squib pin pullers, nut separators, shockless paraffin actuators, or any number of similar release mechanisms.

The plurality of SIs include up to six SIs. Each of the plurality of SIs further include at least one shield for protecting the plurality of SIs from heat and/or radiation. Moreover, the MIDAS science payload system provides nanometer-resolution hyperspectral passive imaging by means of the MTA acting as an FTIS. The PCS provides for a range of ±15° tip/tilt motion to the mechanical subsystem, relative to the spacecraft.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention, particularly with regard to the MIDAS system array diameter, which scales readily from under 1 meter in diameter to well over 5 meters in diameter. Furthermore, the quantity and particular functionality of the plurality of SIs may vary, since the SIs are tailored to each specific mission's science needs.

BRIEF DESCRIPTION OF THE DRAWINGS

Referring now to the drawings, in which like reference numbers represent corresponding parts throughout.

DETAILED DESCRIPTION OF THE INVENTION

The present invention provides an innovative approach which enables a greatly increased return from planetary science remote sensing missions. Specifically, the MIDAS provides a large-aperture, wide-field telescope at a fraction of the cost, mass and volume of conventional space telescopes, by integrating and improving upon several advanced optical interferometry technologies, such as those disclosed in U.S. Pat. No. 5,905,591, entitled "MULTI-APERTURE IMAGING SYSTEM," to produce a mature multiple aperture array that addresses the highest needs for advancing future planetary science remote sensing. The major optical assemblies are integrated into MIDAS as the primary remote sensing science payload, thereby reducing the cost, resources, complexity, integration and risks associated with a set of back-end SIs tailored to a specific mission, such as advanced SIs used for planetary remote sensing missions.

Figure 1:
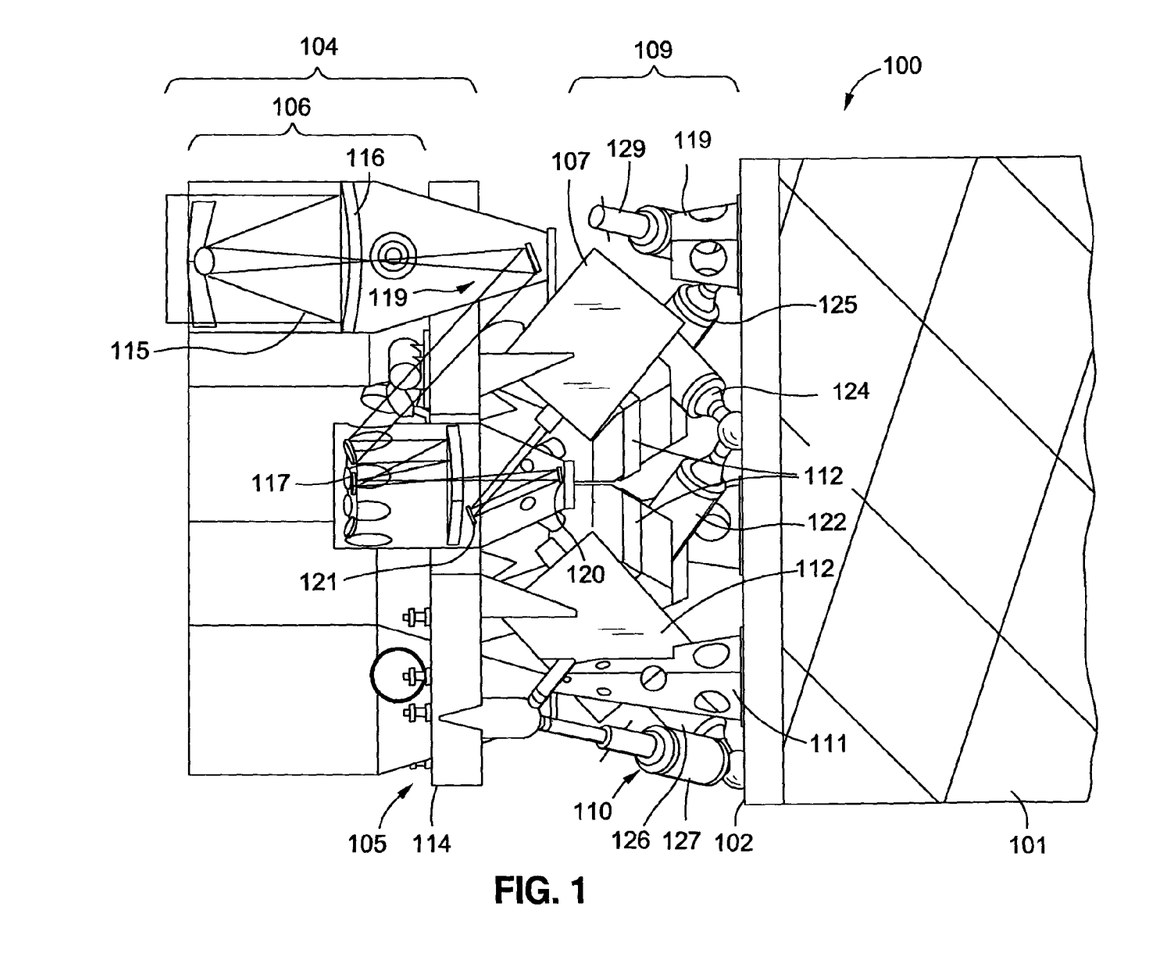
FIG. 1 depicts a side view of the MIDAS science payload system, according to one arrangement of the present invention.
Figure 2:
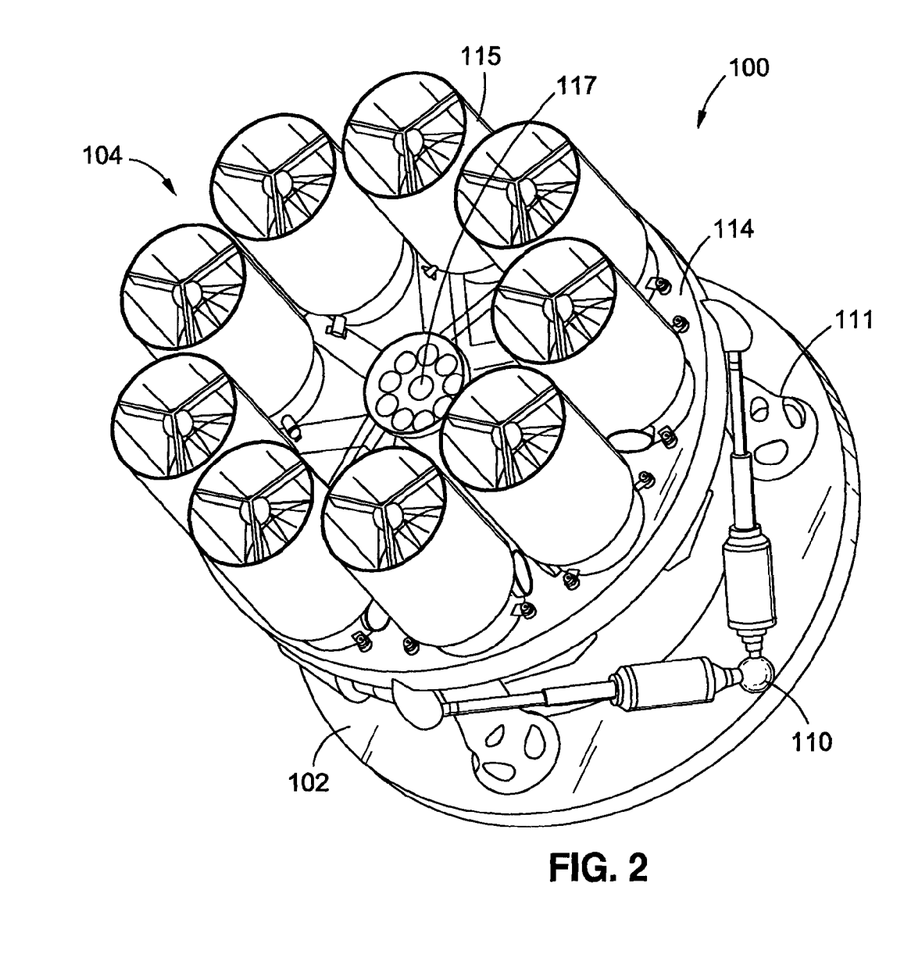
FIG. 2 depicts a front perspective view of the FIG. 1 MIDAS science payload system.
Figure 3:
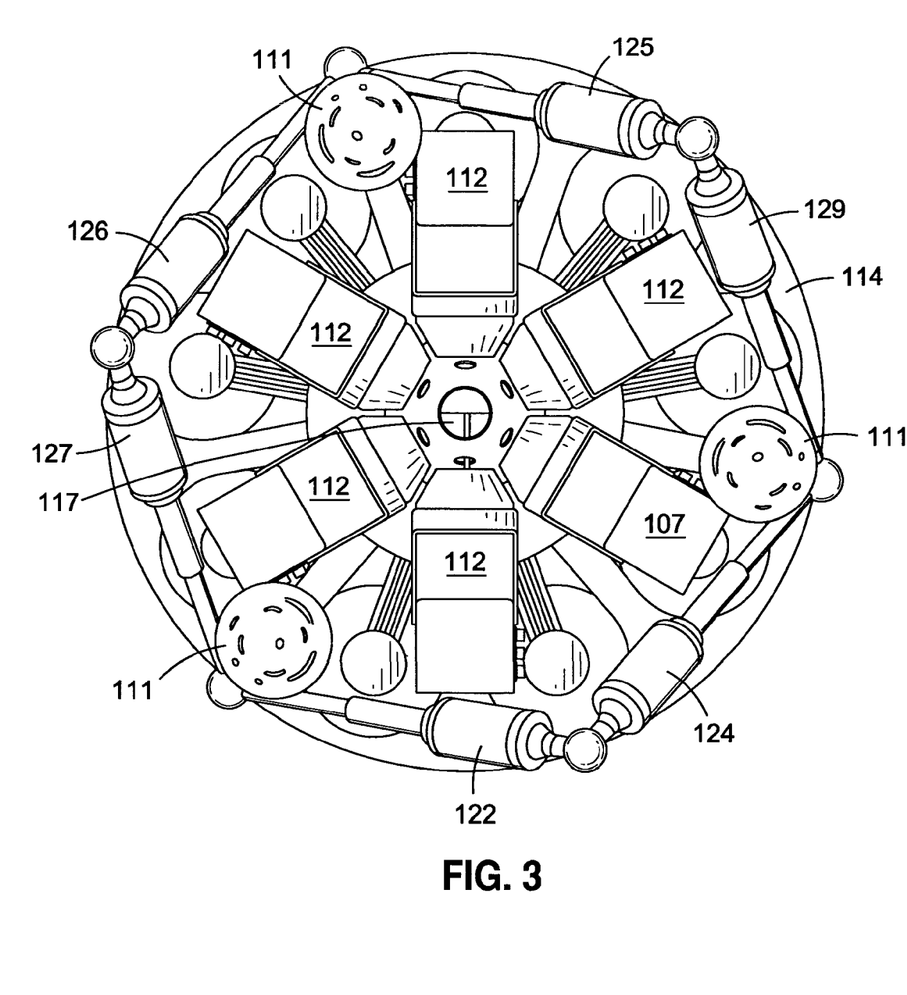
FIG. 3 depicts a bottom view of the FIG. 1 MIDAS science payload system.

FIGS. 1, 2 and 3 respectively depict a side view, a front perspective view, and a bottom view of the MIDAS science payload system according to one arrangement of the present invention. Briefly, the MIDAS science payload system is mounted on a spacecraft, and includes a spacecraft interface ring, the spacecraft interface ring affixing the MIDAS science payload system to the spacecraft, and an MTA. The MTA further includes a mechanical subsystem further including an optical bench, an optical subsystem mounted upon the mechanical subsystem, the optical subsystem collecting light and merging the light into a passive, actively-sensed or hyperspectral image, by means of WFSC based on phase diversity techniques, and a laser subsystem, the laser subsystem providing laser illumination. The MIDAS science payload system also includes a PCS, the PCS providing six degree-of-freedom motion to the mechanical subsystem in an operational configuration, the PCS further including a hexapod in physical communication with and between the spacecraft interface ring and the mechanical subsystem. The MIDAS science payload system also includes a plurality of launch locks affixed to the spacecraft interface ring, the plurality of launch locks supporting the MTA in a stowed configuration, and a plurality of SIs mounted on the optical bench obverse to the optical subsystem, the plurality of SIs individually and concurrently sensing the passive, actively sensed or hyperspectral image.

The design and key features of the present invention provide an innovative and revolutionary approach to remote sensing imaging systems, aimed at increasing the return on future planetary science missions. Specifically, MIDAS provides a large-aperture, wide-field, diffraction limited telescope at a fraction of the cost, mass and volume of conventional telescopes, by integrating and advancing optical interferometry technologies into a mature multiple aperture array that addresses one of the highest needs for advancing future planetary science remote sensing. As such, MIDAS acts as a single front-end remote sensing science payload for common missions, reducing the cost, resources, complexity, and risks of a set of back-end SIs tailored to each specific mission. Autonomous alignment and focus by the WFSC acting directly from the extended scene or point source of interest enables MIDAS remote operations in space, including deep space planetary missions.

In more detail, MIDAS science payload system 100 is mounted on a spacecraft 101, and includes spacecraft interface ring 102, spacecraft interface ring 102 affixing MIDAS science payload system 100 to spacecraft 101, and MTA 104. MTA 104 further includes mechanical subsystem 105 further including optical bench 114, optical subsystem 106 mounted upon mechanical subsystem 105, optical subsystem 106 collecting light and merging the light into a passive, actively sensed, or hyperspectral image, including WFSC functions, and laser subsystem 107, laser subsystem 107 providing laser illumination. MIDAS science payload system 100 also includes PCS 109, PCS 109 providing six degree-of-freedom motion to the mechanical subsystem in an operational configuration, and further including hexapod 110 in physical communication with and between spacecraft interface ring 102 and mechanical subsystem 105. MIDAS science payload system 100 further includes plurality of launch locks 111 affixed to spacecraft interface ring 102, plurality of launch locks 111 supporting MTA 104 in a stowed configuration, and plurality of SIs 112 mounted on optical bench 114 obverse to optical subsystem 106, plurality of SIs 112 individually and concurrently sensing the passive, actively sensed, or hyperspectral image.

As indicated above, MIDAS science payload system 100 supports an operational configuration, in which PCS 109 provides six degree-of-freedom motion to the mechanical subsystem, and a stowed configuration, in which plurality of launch locks 111 are supporting MTA 104. The stowed configuration is utilized, for example, under launch load conditions, where it is desirable for plurality of launch locks 111 to provide increased structural rigidity and integrity to MIDAS science payload system 100. Alternatively, the operational configuration is utilized during periods where the major subsystems are deployed and are operational, such as times where optical subsystem 106 is actively collecting light and merging the light into a passive, actively-sensed or hyperspectral image, including WFSC functions. When MIDAS is operational the optical bench is supported and pointed by hexapod 110 mounted from the spacecraft interface ring 102.

Although optical bench 114 is described and illustrated as being circular shaped, other shapes are contemplated. Optical bench 114 provides a stable reference for co-mounted optical subsystem 106 and plurality of SIs 112. Optical bench 114 is comprised of a thermally stable material, such as a graphite cyanate composite or other material, and is lightweighted, such as by sandwich-style construction.

Figure 4:
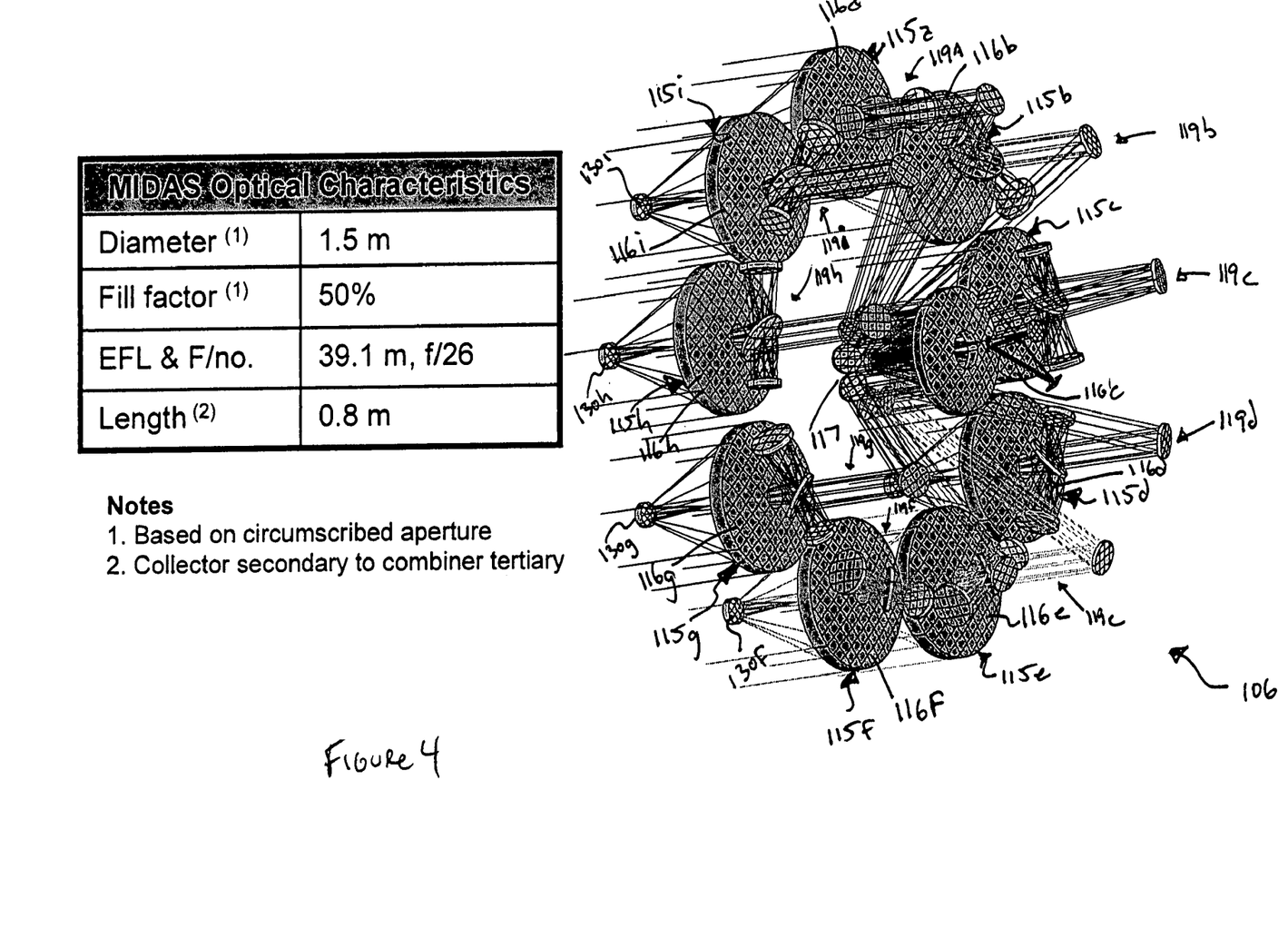
FIG. 4 depicts the optical subsystem of the FIG. 1 MIDAS science payload system.
Figure 5:
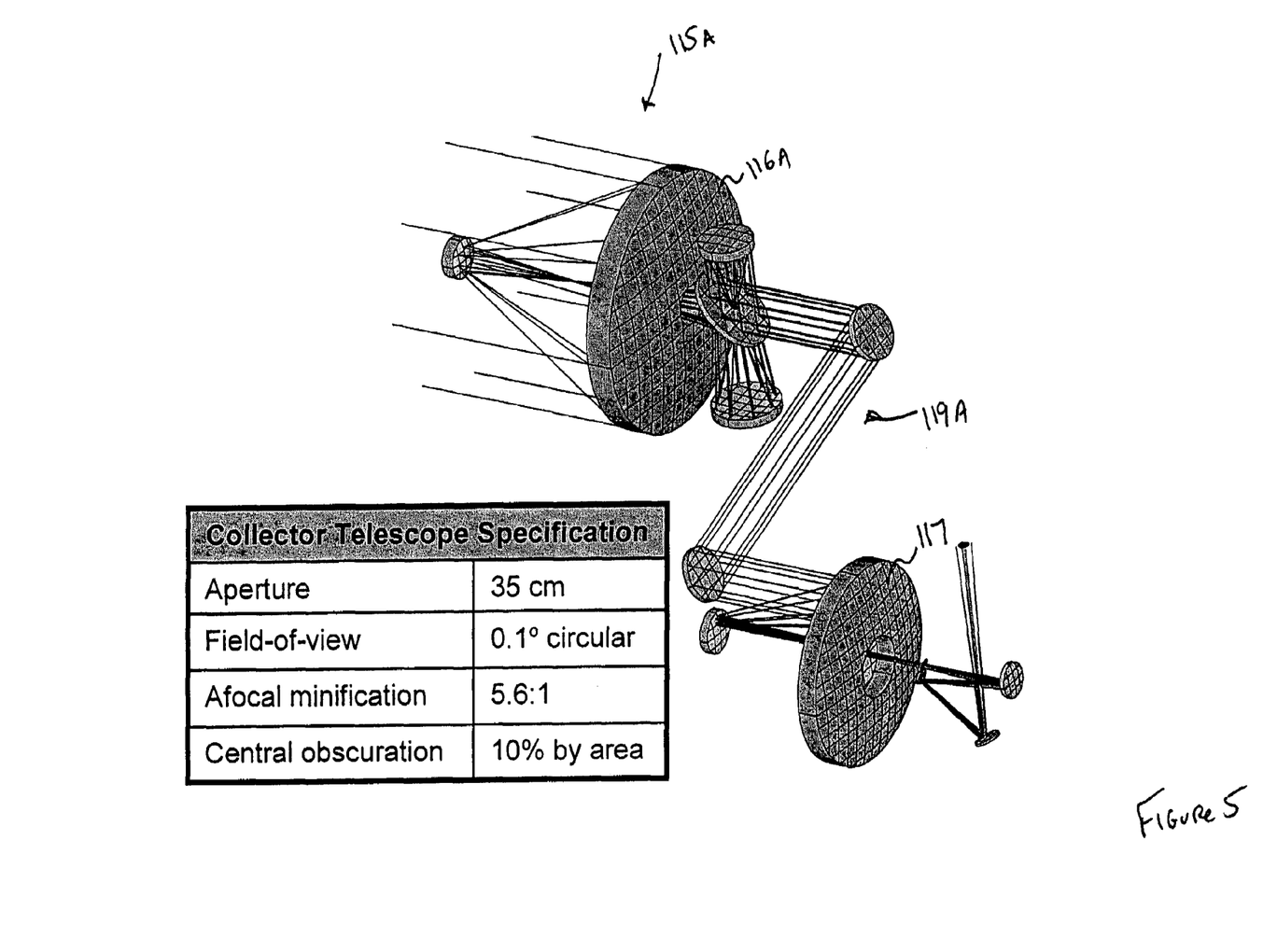
FIG. 5 depicts one collector telescope, one relay optics section, and the central combiner of the FIG. 1 MIDAS science payload system.

FIG. 4 depicts the optical subsystem of the FIG. 1 MIDAS science payload system, and FIG. 5 depicts one collector telescope, one relay optics section, and the central combiner of the FIG. 1 MIDAS science payload system. Optical subsystem 106 further includes plurality of collector telescopes 115 (depicted as nine collector telescopes 115a to 115i) each with a primary mirror 116 (depicted as nine primary mirrors 116a to 116i) and a secondary mirror 130 (depicted as nine secondary mirrors 130a to 130i), where plurality of collector telescopes 115 are arranged in a circular sparse array. Fewer or more collector telescopes can be utilized, and the collector telescopes can be formed into any number of array shapes.

Optical subsystem 106 also includes central combiner 117, and plurality of relay optics sections 119 (depicted as relay optics sections 119a to 119i), plurality of relay optics sections 119 transporting light from plurality of collector telescopes 115 to central combiner 117 without introducing image rotation or affecting light polarization. Each collector telescope has an associated relay optics section for transporting light to the central combiner. Several contemplated imaging capabilities for MIDAS include ultraviolet, infrared and/or visible imaging, stereo imaging, single phased imaging, multiple concurrent imaging, and/or polarimetric imaging.

The MIDAS optical design has a number of unique features that provide significant benefits to planetary science remote sensing. Specifically, it has a large optical field of regard ("FOR") that is well corrected and it is capable of steering the detector's FOV over this FOR with internal steering means. MIDAS is also used as a very high resolution imaging Fourier transform spectrometer, as it has internal pathlength control over each of its individual optical paths emanating from the plurality of collector apertures.

Returning now to FIGS. 1 to 3, the plurality of collector telescopes 115 include nine 35-centimeter aperture afocal collector telescopes, where plurality of collector telescopes 115 arranged in the circular sparse array have a 50% array fill factor. Plurality of collector telescopes 115 comprise a synthetic aperture of 1.5 meters. Collector telescopes which are larger or smaller than 35-centimeters, or which have a fill factor of greater than or less than 50% are also contemplated In an alternate aspect, since MIDAS is highly scalable to a wide range of growth configurations, MIDAS readily scales with very little change to 5 meters in synthetic aperture or higher, with the upper end limitation imposed by existing launch vehicle payload fairing diameters. Even larger or smaller synthetic apertures are possible by implementing a change from fixed to deployable collector telescopes, while retaining the full complement of MIDAS system features, functionality, and capabilities.

MIDAS science payload system 100 is packaged within a payload volume of 1.6 meters in diameter by 1.5 meters long. In general, MIDAS uses an array of collector telescopes together with relay optics, a combiner, and a set of back-end SIs to form an advanced remote sensing system. Although the present invention is described herein as a 1.5 meter MIDAS point design using nine 35-centimeter aperture telescopes arranged in a circular sparse array having a 50% array fill factor to form a synthetic aperture of 1.5 meters, other dimensions and configurations are also contemplated, consistent with scaling of the entire MIDAS array diameter to suit specific mission needs.

Each of plurality of collector telescopes 115 have a FMCG collector design, produce a real exit pupil located at a considerable distance behind primary mirror 116, and are fully corrected for sine magnification error. The specific FMCG collector design used is uniquely developed for this class of applications, and is the subject of U.S. patent application Ser. No. 10/803,786, entitled "MULTI-APERTURE HIGH-FILL FACTOR TELESCOPE," filed Mar. 17, 2004. Central combiner 117 is a three-mirror anastigmat, further including internal steering mirror 120 at an exit pupil. Central combiner 117 further includes selector mirror 121, where selector mirror 121 directs the image to at least one of plurality of SIs 112.

Plurality of relay optics sections 119 further include at least one fixed mirror and at least one active plano mirror, and are disposed in nominally collimated light. Plurality of relay optics sections 119 each provide tip/tilt control, piston control, and/or exit pupil mapping. MIDAS further advances MTA optical systems. Specifically, the 1.5 meter MIDAS optical design uses a series of individual afocal collector telescopes, followed by a relay optics section with fixed and active plano mirrors, which are located in nominally collimated light. The MIDAS optical design also uses a central combiner telescope to merge the light from all apertures into a passive, actively sensed or hyperspectral image. WFSC based on phase diversity or other comparable techniques provides for automated alignment, focus and stable imaging with MIDAS. The degree of aberration correction demanded for a distributed telescope array to form an extended field image with proper phasing is well known in the art, and is provided for in the present MIDAS optical design. Alternate collector designs, and alternate configurations the plurality of relay optics sections can also be used.

Laser subsystem 107 enables light detection and ranging ("LIDAR"), vibrometry, illumination, ablative spectroscopy, breakdown spectroscopy, fluorescence spectroscopy, Raman spectroscopy, and/or time-resolved spectroscopy. In its active remote sensing modes using the integrated laser subsystem, MIDAS enables LIDAR, vibrometry, illumination, various active laser spectroscopies, including but not limited to ablative, breakdown, fluorescence, Raman and time-resolved spectroscopy. The MIDAS optical design also provides high-resolution imaging for long dwell times at high altitudes, thereby enabling real-time, wide-area remote sensing of dynamic changes in planet surface processes. These remote sensing capabilities significantly enhance astrobiologic, geologic, atmospheric, and similar scientific objectives for planetary exploration missions.

The MIDAS laser subsystem provides integral laser assemblies that can be used in planetary science missions to provide varying degrees of active remote sensing. These capabilities range from broad area illumination at one or more specific wavelengths of interest, such as for remote Raman or fluorescence spectroscopy or enhanced stereo imaging, to ablation of small target areas on the surface, such as for ablative spectroscopy by the MIDAS backend SIs.

The laser subsystem enables the MIDAS array to illuminate portions of the planet surface for active imaging, while also enabling use of active remote sensing techniques to probe the geodynamic characteristics and behavior of the planet surface and its processes. MIDAS enabled LIDAR can significantly enhance the surface coverage and accuracy of topographic measurements by means of the large effective aperture and collecting area of the array. MIDAS enabled vibrometry similarly offers the possibility of active remote sensing of dynamic planet processes, such as fluctuation of the planet surface due to tidal forces, by enabling not only high resolution topography but doing so from high altitudes with large dwell times, repeatedly over months of orbits on a mission, such as a Jupiter Icy Moons Orbiter ("JIMO") mission.

Hexapod 110 further includes six actuated struts, including struts 122, 124, 125, 126, 127 and 129, where each actuated strut further functions as a linear actuator by means of a rotary motor driving a ball nut device, a structural tube, and a flexured fitting on each end of the strut. Each actuated strut further includes a low outgassing liquid or a solid lubricant. The structural tube is comprised of a graphite-cyanate composite.

The MIDAS PCS includes a hexapod architecture scan platform consisting of six actuated struts. Each strut contains a linear actuator with sufficient travel to allow the MTA a ±15° FOR. The actuator contains a preloaded, recirculating ball nut device utilizing either a low outgassing liquid or solid lubricant. The actuator motor can be of the DC variety with an integral brake or stepper drive. The actuator is located between graphite cyanate composite structural tubes. At the ends of each strut are flexured fittings used to reduce motion deadband.

One significant advantage of using a hexapod architecture is that it provides six degree-of-freedom motion of the base with graceful degradation should any of the actuators fail. In this application the hexapod scan platform provides overall tip and tilt control of the MTA, and its six available degrees of freedom are thus very redundant. Any one failed actuator does not degrade pointing capability of the MTA at all, because the other five struts fully enable tip and tilt control of the MTA through its entire FOR. Additional strut failures begin to limit the range of MTA tip and tilt motions, to a degree that depends on which of the multiple actuators fail.

The hexapod assembly drives the MTA to be supported on three launch locks in the stowed configuration, although fewer or more launch locks are contemplated. The launch locks allow the hexapod to be free of the additional requirement of supporting the MTA through severe environments, such as for the rigors of the launch environment. By doing this, the hexapod assembly can be made lighter while the stowed MTA can be made more compact, stiffer and stronger for severe environments. The launch lock supports are manufactured out of graphite cyanate composite and are bolted directly to the spacecraft interface plate. The redundant launch locks can be any of the standard types, such as paired squib pin pullers, nut separators, shockless paraffin actuators, or any number of similar release mechanisms.

Figure 6:
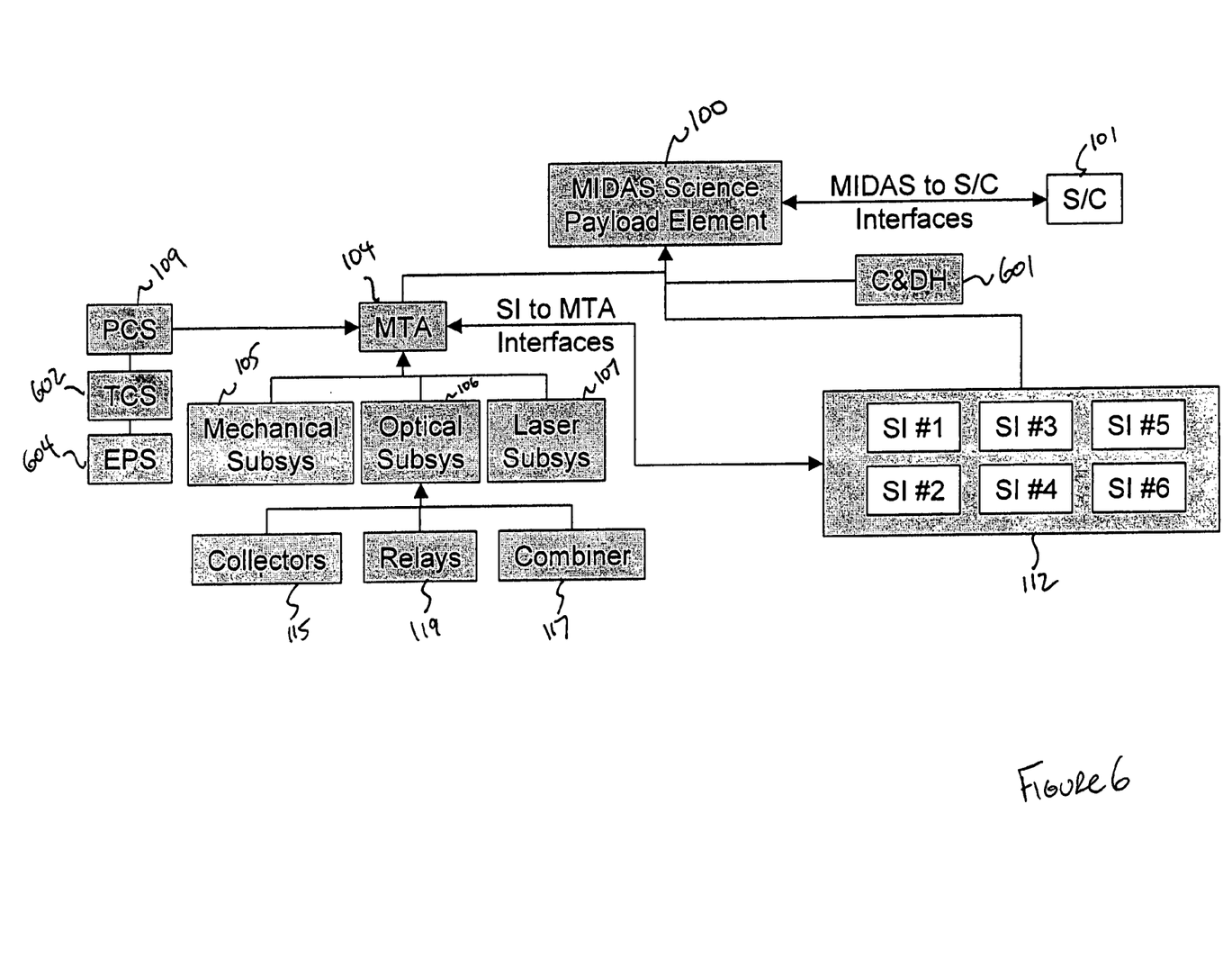
FIG. 6 depicts one example of the MIDAS payload architecture.

FIG. 6 depicts the MIDAS payload architecture. In detail, MIDAS science payload system 100 includes MTA 104, plurality of SIs 112, and common command & data handling ("CD&H") subsystem 601. MTA 104 includes its core mechanical subsystem 105, optical subsystem 106, and laser subsystem 107 supported by PCS 109, thermal control subsystem ("TCS") 602, and electrical power subsystem ("EPS") 604.

Plurality of launch locks 111 include three launch locks, where plurality of launch locks 111 are comprised of a metal or composite material. Plurality of launch locks 111 are affixed to spacecraft interface ring 102 with bolts or by other methods. Plurality of launch locks 111 are paired squib pin pullers, nut separators, shockless paraffin actuators, or other known apparatus.

Plurality of SIs 112 include six SIs. Each of plurality of SIs 112 further include at least one shield (not depicted) for protecting the plurality of SIs from heat and/or radiation. Plurality of SIs 112 have no moving parts.

By interfacing to multiple SIs, MIDAS enables either individual sequential or concurrent SI operations in substantially all functional modes. Passive imaging modes with MIDAS enable remote sensing resolution at the diffraction limit of the synthetic aperture, sequentially by each SI or at somewhat lower resolution by multiple SIs acting concurrently on the image, such as in different wavebands. MIDAS inherently provides nanometer-resolution hyperspectral passive imaging by means of the MTA operating as an FTIS, without the need for any moving parts in the SIs.

The back-end SIs occupy a volume dictated by a constraint on minimizing the overall science payload volume, consistent with current JIMO resource allocations. For somewhat larger science payload volume allocations, the individual SIs can readily extend aft much further, with an associated increase in the spacecraft interface ring diameter.

The 1.5 meter MIDAS MTA estimated mass, when sized to accommodate and support six back-end SIs, is approximately 250 kilograms depending on specific mission environments and requirements. The 1.5 meter MIDAS occupies 3.1 $m^3$ of volume (including a total SI volume of 0.125 $m^3$), and measures 1.63 meters diameter by 1.53 meters long. Extending the instruments aft past the spacecraft interface plane can provide additional SI length, if needed.

MIDAS science payload system 100 provides nanometer-resolution hyperspectral passive imaging, by means of the MTA acting as an FTIS. PCS 109 provides for a range of ±15° tip/tilt motion to mechanical subsystem 105, relative to spacecraft 101. The MIDAS mechanical subsystem integrates the optical, laser and support subsystems. A thermally stable graphite-cyanate circular optical bench meters the telescopes, supports the beam combiner, and interfaces to each of the six back-end SIs.

The optical bench is pointed with respect to the spacecraft via a hexapod assembly, made up of six linearly actuated struts, allowing a ±15° tip/tilt of the entire MTA relative to the spacecraft. The hexapod is also used to stow the MTA onto three launch locks to increase structural rigidity and integrity when desired, such as under launch load conditions. The spacecraft interface plate mounts to the ends of the hexapod, making for a clean spacecraft interface. Substantially all payload electrical harnessing connectors are located on this spacecraft interface plate.

The MIDAS optical design features high-resolution imaging for long dwell times at high altitudes, of less than 1 meter ground sampling distance ("GSD") from 5000 km, such as the spiral orbits on the JIMO mission, thereby enabling regional remote sensing of dynamic planet processes. Furthermore, the MIDAS optical design provides for an ultra-high resolution imaging at less than 2 centimeters GSD from the 100 kilometer science orbits, enabling remote sensing searches for life sign processes. For NASA's new class of Nuclear Electric Propulsion ("NEP") missions, such as JIMO, MIDAS taps the extensive NEP-enable power allocation for science with its active remote sensing modes, using an integrated laser source, to enable LIDAR, vibrometry, surface illumination, and active or ablative spectroscopy science investigations, integrated with the collection of back-end SIs, as well as optical laser communication for science data return.

By comparison, for any given aperture size, a conventional monolithic telescope, such as a TMA of equivalent resolving power, occupies approximately three times the total volume of the MIDAS concept. In the axial direction of the launch vehicle the MIDAS concept is approximately three times more compact than a TMA, for a given aperture size, simplifying packaging and integration.

Indeed, applications of MIDAS technology are not limited to only space-based science missions, as evidenced by continued interest and development of concepts for terrestrial-based distributed aperture optical systems. The advantages afforded distributed aperture approaches to the ever-increasing desire for higher resolution and total optical throughput, including their compact volume, lower mass, reduced cost, and modularity benefits for maintenance and upgrades, extend across the entire spectrum of planetary science remote sensing future needs.

Implementing a MIDAS approach for planetary remote sensing missions, such as the Prometheus class, enables a wide range of science operating modes, features and capabilities. Implementing these capabilities depends on the science-driven needs that determine the selection of a mission-specific collection of back-end SIs, and the end-to-end optical system features chosen for performance optimization. The combination of MIDAS passive and active modes, each with individual sequential or concurrent SI operations, offers the opportunity to increase potential science return for planetary science missions many fold.

For example, on a mission to the icy moons of Jupiter, MIDAS aligns well with top level science requirements by providing high-resolution wideband imaging of the geology and glaciology of the surface, high spectral resolution to help determine the geochemistry of surface materials, active spectroscopy techniques to help in the search for signs of life processes, active imaging to help conduct seismic and tidal studies, and high optical throughput to enable laser communication approaches for science data return.

MIDAS helps maximize the science data return on future planetary science missions such as JIMO, made possible by NEP enabling significantly increased mass and power resources allocated to the science payload, as well as enabling extended duration of near-constant remote sensing science data taking, which is about four years in the Jovian system for the current JIMO baseline mission. These missions use NEP to achieve relatively large amounts of propulsion capability at the outer planets, allowing an advanced remote sensing approach like MIDAS to have extended and extensive observation campaigns from a range of altitudes and phase angles, aligning very well with the primary and secondary science objectives.

By featuring such fine spatial and spectral resolution capability, MIDAS maximizes the value of remote sensing science by enabling not only orders of magnitude better resolution of the surface from the 100 kilometer science orbit than previously obtained at the outer planets, but also about two years of science data taking at better than 1 meter resolution of the planet surface during the spiral orbits collectively around the icy moons at Jupiter. When considered in the context of the astrobiological search for signs of life processes, for example on Jupiter's icy moon Europa, the MIDAS approach provides many features that enable science discovery.

The sensor according to the present invention enables comparable diffraction-limited optical performance, packaged in a payload that is about one-third the size of a conventional telescope. The present invention is considerably lighter and has a lower cost because common smaller primary mirror optics are used, and the present invention is more capable because of electro-optical capabilities. One such electro-optical capability relates to the incorporation of optical delay lines for each collector enabling precision hyperspectral imaging, as well as by use of the combiner to enable concurrent imaging across all back end SIs and by incorporating active laser illuminated modes.

The overall payload concept is a novel feature, particularly its large aperture, compact size, low mass, multiple SIs, and highly scalable design that are tightly integrated to provide an efficient and effective electro-optical system providing passive and active imaging, hyperspectral imaging, concurrent imaging, LIDAR, vibrometry, and active spectroscopy capabilities for planetary remote sensing that exceed existing capabilities by at least one order of magnitude.

The MTA optical design is novel, with several of its features being the large and uniform FOV achieved using distributed afocal apertures, relay optics, combiner and wavefront control that are integrated together to provide a single phased image resolved at the diffraction limit of the overall MIDAS array synthetic aperture, or alternatively a collection of somewhat lower resolution unstacked phased images, for processing by the back-end SIs.

The mechanical system design is unique, with its primary features being achieving a large FOR stable opto-mechanical platform for use in severe space environments by means of active vibration isolation, hexapods pointing, and athermalized structural design. The present invention features an active sensing capability using the integrated laser subsystem and compatible back-end SI sensors to achieve a wide variety of active remote sensing ranging from illuminated target imaging to ablative target spectroscopies.

The sensor according to the present invention integrates advanced optical interferometry technologies and proven distributed aperture sensing techniques, including wavefront sensing, phasing and control. Specifically, MIDAS is an MTA system that provides a large-aperture, wide-field, diffraction-limited telescope at a fraction of the cost, mass and volume of conventional space telescopes.

Figure 7:
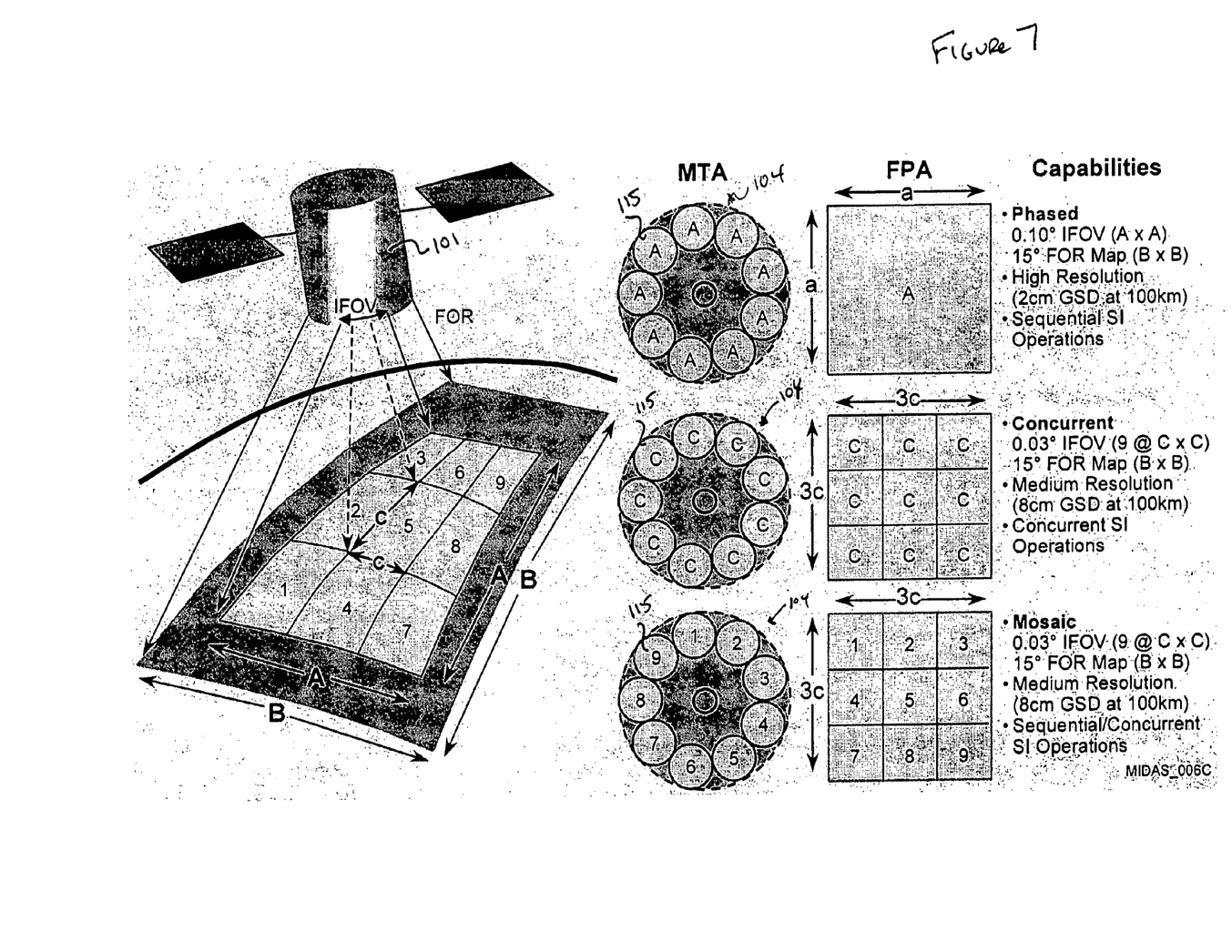
FIG. 7 illustrates the MIDAS functional modes and capabilities.

As depicted in FIG. 7, MIDAS acts as an integrated science payload with common front-end optics, while accommodating a collection of multiple back-end SIs that are tailored to the remote sensing data collection needs of a specific mission. MIDAS features a concurrent imaging mode that allows these back-end SIs to process images in parallel, as well as a high-resolution hyperspectral imaging mode. Imaging spectroscopy is achieved by means of operating the optical pathlength delay controls in MIDAS, acting as an FTIS.

In more detail, MIDAS supports a phased imaging mode, with a 0.10° IFOV and ±15° FOR, with high resolution imaging of approximately 2-centimeters GSD at 100 kilometers, using individual sequential SI operations. Additionally, MIDAS supports a concurrent imaging mode, with a 0.03° instantaneous FOV ("IFOV") and ±15° FOR, with medium resolution imaging of approximately 8-centimeters GSD at 100 kilometers, using concurrent SI operations. Alternatively, MIDAS supports a mosaic imaging mode, with a 0.03° IFOV and ±15° FPR, with medium resolution imaging of approximately 8-centimeters GSD at 100 kilometers, using concurrent and individual sequential SI operations.

MIDAS science payload system 100 interfaces to plurality of SIs 112 to allow for redundancy and to enable synchronized concurrent science investigations, such as science investigations which use multiple highly sensitive spectrometers. Passive imaging modes with MIDAS science payload system 100 enable high resolution remote sensing at the diffraction limit of the overall synthetic aperture, sequentially by each of plurality of SIs 112 as well as in somewhat lower resolution by multiple of the plurality of SIs 112 acting concurrently on the image, such as in different wavebands. MIDAS inherently provides nanometer-resolution hyperspectral passive imaging without the need for any moving parts within plurality of SIs 112, by means of the MTA acting as an FTIS.

The 1.5 meter MIDAS design accommodates up to six back-end SIs, that can each sense and interrogate the optical image provided by the MTA. The SIs are individually, and if need be also collectively, enclosed in one or more shields for enhanced detector cooling and, when necessary, for radiation protection. Plurality of SIs 112 can be configured unique to the remote sensing needs of a specific science mission, while using the same MTA and pointing platform hardware that is common to a range of planetary science missions, providing a balance between maximizing science return on specific missions like JIMO while minimizing nonrecurring development and qualification costs for a collection of missions, such as for the Prometheus project.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A multiple instrument distributed aperture sensor science payload system mounted on a spacecraft, comprising:
    a spacecraft interface ring, said spacecraft interface ring affixing the multiple instrument distributed aperture sensor science payload system to the spacecraft;
    a multiple telescope array, said multiple telescope array further comprising:
        a mechanical subsystem further comprising an optical bench,
        an optical subsystem mounted upon said mechanical subsystem, said optical subsystem collecting light and merging the light into a passive, actively sensed or hyperspectral image, including wavefront sensing and control, and
        a laser subsystem, said laser subsystem providing laser illumination for active remote sensing data;
    a pointing and control subsystem, said pointing and control subsystem providing six degree-of-freedom motion to said mechanical subsystem in an operational configuration, and further comprising a hexapod in physical communication with and between said spacecraft interface ring and said mechanical subsystem;
    a plurality of launch locks affixed to said spacecraft interface ring, said plurality of launch locks supporting said multiple telescope array in a stowed configuration; and
    a plurality of science instruments mounted on said optical bench obverse to said optical subsystem, each of said plurality of science instruments individually and concurrently sensing distinct portions of the passive, actively sensed or hyperspectral image.

2. The multiple instrument distributed aperture sensor science payload system according to claim 1, wherein said optical bench is circular.

3. The multiple instrument distributed aperture sensor science payload system according to claim 1, wherein said optical bench provides a stable reference for said optical subsystem and said plurality of science instruments.

4. The multiple instrument distributed aperture sensor science payload system according to claim 1, wherein said optical bench is comprised of a thermally stable material.

5. The multiple instrument distributed aperture sensor science payload system according to claim 1, wherein said optical bench is comprised of a graphite cyanate composite.

6. The multiple instrument distributed aperture sensor science payload system according to claim 1, wherein the multiple instrument distributed aperture sensor science payload is packaged within a payload volume of 1.6 meters in diameter by 1.5 meters long.

7. The multiple instrument distributed aperture sensor science payload system according to claim 1, wherein said laser subsystem enables light detection and ranging ("LIDAR"), vibrometry, illumination, ablative spectroscopy, breakdown spectroscopy, fluorescence spectroscopy, Raman spectroscopy, and/or time-resolved spectroscopy.

8. The multiple instrument distributed aperture sensor science payload system according to claim 1, further comprising a thermal control subsystem.

9. The multiple instrument distributed aperture sensor science payload system according to claim 1, further comprising an electrical power subsystem.

10. The multiple instrument distributed aperture sensor science payload system according to claim 1, wherein said plurality of launch locks comprise three launch locks.

11. The multiple instrument distributed aperture sensor science payload system according to claim 1, wherein said plurality of launch locks are comprised of a metal or composite material.

12. The multiple instrument distributed aperture sensor science payload system according to claim 1, wherein said plurality of launch locks are bolted to said spacecraft interface ring.

13. The multiple instrument distributed aperture sensor science payload system according to claim 1, wherein said plurality of launch locks are paired squib pin pullers.

14. The multiple instrument distributed aperture sensor science payload system according to claim 1, wherein said plurality of launch locks are nut separators.

15. The multiple instrument distributed aperture sensor science payload system according to claim 1, wherein said plurality of launch locks are shockless paraffin actuators.

16. The multiple instrument distributed aperture sensor science payload system according to claim 1, wherein said plurality of science instruments comprise six science instruments.

17. The multiple instrument distributed aperture sensor science payload system according to claim 1, wherein each of said plurality of science instruments further comprises at least one shield for protecting said plurality of science instruments from heat and/or radiation.

18. The multiple instrument distributed aperture sensor science payload system according to claim 1, further comprising a command and data handling subsystem.

19. The multiple instrument distributed aperture sensor science payload system according to claim 1, wherein the multiple instrument distributed aperture sensor science payload system provides nanometer-resolution hyperspectral passive imaging using the multiple telescope array acting as a Fourier Transform Imaging Spectrometer.

20. The multiple instrument distributed aperture sensor science payload system according to claim 1, wherein said plurality of science instruments require no moving parts.

21. The multiple instrument distributed aperture sensor science payload system according to claim 1, wherein said pointing and control subsystem provides ±15° tip/tilt motion to the mechanical subsystem, relative to the spacecraft.

22. The multiple instrument distributed aperture sensor science payload system according to claim 1, wherein said optical subsystem further comprises:
 a plurality of collector telescopes each with a primary and a secondary mirror, said plurality of collector telescopes arranged in a circular sparse array;
 a central combiner; and
 a plurality of relay optics sections, said plurality of relay optics sections transporting light from said plurality of collector telescopes to said central combiner without introducing image rotation or affecting light polarization.

23. The multiple instrument distributed aperture sensor science payload system according to claim 22, wherein the plurality of collector telescopes comprise nine collector telescopes.

24. The multiple instrument distributed aperture sensor science payload system according to claim 22, wherein the plurality of collector telescopes comprise 35-centimeter aperture collector telescopes.

25. The multiple instrument distributed aperture sensor science payload system according to claim 22, wherein the plurality of collector telescopes are afocal.

26. The multiple instrument distributed aperture sensor science payload system according to claim 22, wherein said plurality of collector telescopes arranged in the circular sparse array have a 50% array fill factor.

27. The multiple instrument distributed aperture sensor science payload system according to claim 22, wherein said plurality of collector telescopes comprise a synthetic aperture of 1.5 meters.

28. The multiple instrument distributed aperture sensor science payload system according to claim 22, wherein each of said plurality of collector telescopes have a four-mirror Cassegrain-Gregorian collector design.

29. The multiple instrument distributed aperture sensor science payload system according to claim 22, wherein each of said plurality of collector telescopes produce a real exit pupil located at a considerable distance behind the primary mirror, fully corrected for sine magnification error.

30. The multiple instrument distributed aperture sensor science payload system according to claim 22, wherein said central combiner is a three-mirror anastigmat, further comprising an internal steering mirror at an exit pupil.

31. The multiple instrument distributed aperture sensor science payload system according to claim 22, wherein said plurality of relay optics sections each provide tip/tilt control, piston control, and/or exit pupil mapping.

32. The multiple instrument distributed aperture sensor science payload system according to claim 22, wherein said central combiner further comprises a selector mirror.

33. The multiple instrument distributed aperture sensor science payload system according to claim 32, wherein said selector mirror directs the image to at least one of the plurality of science instruments.

34. The multiple instrument distributed aperture sensor science payload system according to claim 32, wherein said plurality of relay optics sections further comprise at least one fixed mirror and at least one active plano mirror.

35. The multiple instrument distributed aperture sensor science payload system according to claim 32, wherein said plurality of relay optics sections are disposed in nominally collimated light.

36. The multiple instrument distributed aperture sensor science payload system according to claim 1, wherein said hexapod further comprises six actuated struts.

37. The multiple instrument distributed aperture sensor science payload system according to claim 36, wherein each actuated strut functions as a linear actuator by means of a rotary motor driving a ball nut device, a structural tube, and a flexured fitting on each end of said strut.

38. The multiple instrument distributed aperture sensor science payload system according to claim 37, wherein each actuated strut further comprises a low outgassing liquid.

39. The multiple instrument distributed aperture sensor science payload system according to claim 37, wherein each actuated strut further comprises a solid lubricant.

40. The multiple instrument distributed aperture sensor science payload system according to claim 37, wherein said structural tube is comprised of a graphite cyanate composite.

* * * * *